Jan. 11, 1949. E. K. SMITH 2,459,051
TEMPORARY LIFT FOR BIFOCAL SPECTACLES
Filed Feb. 19, 1947
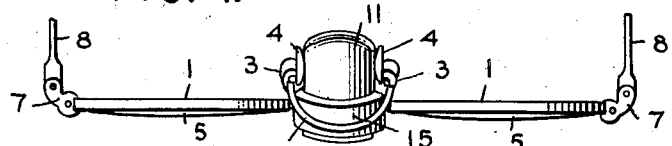
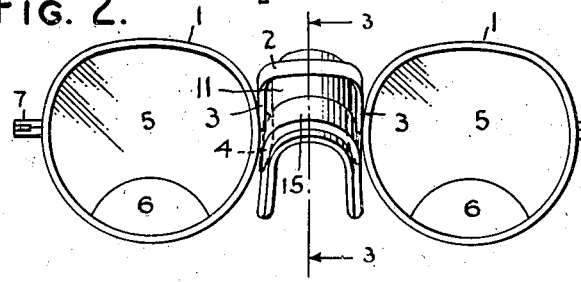
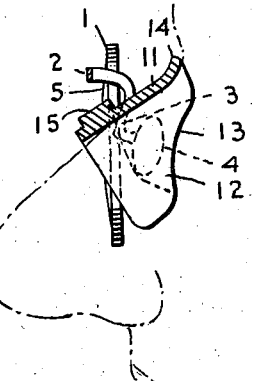
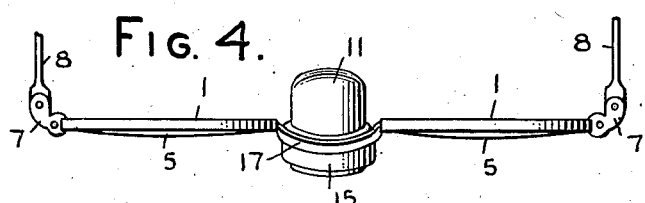
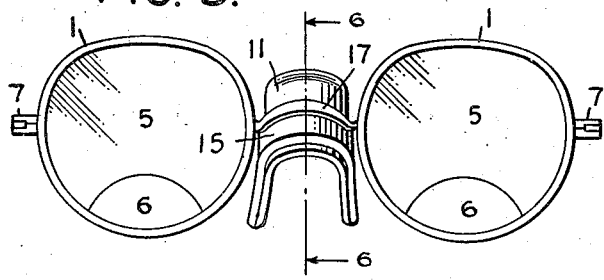
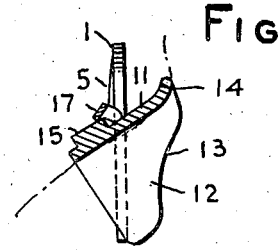
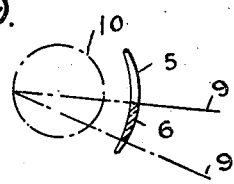
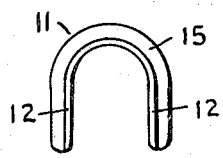
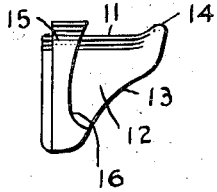
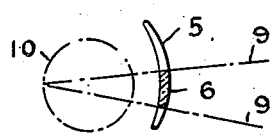
Inventor
E. K. Smith
By Robert Cook
Attorneys Patented Jan. 11, 1949

2,459,051

UNITED STATES PATENT OFFICE 2,459,051

TEMPORARY LIFT FOR BIFOCAL SPECTACLES

Earl K. Smith, Montrose, Pa.

Application February 19, 1947, Serial No. 729,425

3 Claims. (Cl. 88—51)

The present invention relates to supports for bifocal spectacles, and more especially, to a temporary lift for use in holding the lenses of such spectacles in a position elevated above the normal position so as to avoid the inconvenience and physical discomfort occasioned by tilting the head backwards, as heretofore required, to bring the reading or close vision areas of the lenses into position for use under certain conditions.

Usually, the lenses of bifocal spectacles are so made that the inserts or other close reading areas or segments of the lenses are at or near the bottom of the same, so that the line of vision therethrough is somewhat downwardly inclined from the eye, which is the natural or normal angle inasmuch as most reading or close vision is done with the reading matter or other observed subject disposed or supported somewhat below the eye level. As a result of the above, the regular bifocal spectacles have been found to be unsuited or unsatisfactory for use by musicians in reading music while playing the piano, for hospital patients, invalids, and for many occupational, recreational, and other uses where the wearer requires close vision at or near eye level, or higher. In most of such cases, additional spectacles having lenses especially made for the particular conditions of use or special purpose, are required or availed of, with the attendant additional cost to the user, and the further inconvenience of changing spectacles from time to time as the occasion requires.

Accordingly, it is a primary object of the present invention to provide, as a new article of manufacture, a simple, inexpensive, inconspicuous, and light-weight support for bifocal spectacles, said support being of unitary form and fitting over the bridge of the wearer's nose in the zone where the spectacles normally rest on the nose, said support being of predetermined thickness so that when the spectacles are rested thereon, instead of directly on the nose, the support will serve the purpose of lifting the spectacles to bring the reading or close vision lens areas or segments into a position elevated above the normal position.

Another object of the invention is to provide a new article of manufacture in the nature of a temporary lift for bifocal spectacles, said lift being wholly separate from the spectacles, and hence avoiding mutilation, weakening or detraction from the appearance of the spectacles, by reason of requiring no attachment, either temporarily or permanently, thereto, and being easily and quickly applicable onto and removable from the bridge of the wearer's nose.

A further object of the invention is to provide an article of the aforementioned character which may be made of plastic or other suitable light-weight, inexpensive, and unbreakable material, which does not alter the prescription or power of the lenses, which may be universally used with any conventional type or style of spectacles, including rimless glasses or spectacles, spectacles provided with metal rims, military frames, plastic frames, etc., and which affords a fuller and more complete use of the reading or close vision area of the bifocal spectacles.

Other and further objects and advantages of the invention will be hereinafter described and the novel features thereof defined in the appended claims.

In the drawing:

Figure 1 is a view of a temporary support or lift constructed in accordance with the present invention, as seen from above in top plan while supporting a pair of spectacles of one conventional type;

Figure 2 is a view of the arrangement shown in Figure 1, as seen in front elevation;

Figure 3 is a vertical sectional view taken on the line 3—3 of Figure 2, and showing the temporary lift in use on the nose of the wearer, with the nose and a portion of the wearer's face represented in broken lines;

Figure 4 is a top plan view corresponding to Figure 1, with the lift serving to support a pair of spectacles having frames of another conventional type known as military frames;

Figure 5 is a view of the arrangement shown in Figure 4, as seen in front elevation;

Figure 6 is a vertical sectional view taken on the line 6—6 of Figure 5, and generally corresponding to Figure 3;

Figure 7 is a view in side elevation of the temporary support or lift per se;

Figure 8 is a view of the temporary support or lift in end elevation as seen looking towards the lefthand end of Figure 7;

Figure 9 is a diagrammatic view in which the diverging broken lines represent the field of vision through the reading or close vision area of a bifocal lens when in the normal position, and when the temporary support or lift is not in use; and Figure 10 is a diagrammatic view similar to Figure 9, in which the diverging broken lines represent the field of vision through the same lens when the temporary support or lift is in use to elevate or lift the spectacles and their lenses above the normal position shown in Figure 9.

Like reference characters designate corresponding parts in the several figures of the drawing. Referring first to Figures 1 to 3 inclusive, I have shown a pair of spectacles of one conventional type embodying a pair of rims designated 1, 1 connected together by a bridge 2. In this type of spectacles, the bridge 2 does not rest directly upon the nose of the wearer, but rather the bridge is extended downwardly at its opposite ends to provide arms 3, 3 which carry at their lower ends the pads 4, 4 which are adapted to rest upon the nose of the wearer, as illustrated in Figure 3 of the drawing.

Mounted in each of the rims 1, 1 is a lens 5, and each lens is provided with a reading or close vision area, insert or segment 6 at or near the bottom thereof. Hingedly attached, at 7, to each of the rims 1, 1 is an ear-piece or temple 8 to hold the glasses on the wearer's face or nose, with the pads 4, 4 directly engaging the nose in the normal position of use of the spectacles as diagrammatically represented in Figure 9 of the drawing. As will be seen from Figure 9, when the spectacles are disposed in their normal position, the field of vision which is represented by the broken lines designated 9, 9 extends forwardly from the eye which is represented in broken lines at 10, with the field of vision inclining somewhat downwardly when employing the reading or close vision area 6 of the lens 5. Consequently, during use of the reading or close vision areas 6 of the lenses 5, the field of vision does not extend quite to the normal eye level or above the same, and therefore it becomes necessary to tilt the head backwards to enable use of the reading or close vision areas of the lenses for vision at or above eye level, this being the ordinary and most common manner of employing bifocal spectacles for vision at or above eye level. Such backward tilting of the head is not only inconvenient but also physically uncomfortable, particularly when such backward tilting position is maintained for any appreciable length of time, as is oftentimes required in playing music at the piano, performing occupational, recreational and other tasks, and the like.

In order to solve this problem, and to contribute to the convenience and physical comfort of those whose vision requires the aid of bifocal spectacles or glasses, I have provided as a new article of manufacture, a temporary supporting member or lift which is generally designated 11, and which may be quickly and easily applied onto the bridge of the nose of the wearer for the purpose of supporting the spectacles or glasses in a somewhat elevated position, above the normal position, to bring the reading or close vision areas 6, 6 of the lenses 5, 5 into a position for use of these areas at or about, and somewhat above the natural eye level, as diagrammatically represented in Figure 10 of the drawing.

The temporary support or lift 11 may be made of any suitable inexpensive, light-weight, and unbreakable material, and is preferably made of transparent plastic of predetermined thickness, approximately on the order of two and one-half mm., more or less. The lift is preferably arch-shaped so as to extend downwardly at each side of the bridge of the nose of the wearer, as indicated at 12, 12, said extensions forming skirts which are preferably shaped at their free edges to conform to the curvature of the face, as indicated at 13.

At its upper end, the support or lift is shaped so as to turn upwardly slightly, as indicated at 14, so as to fit comfortably in the curve of the face where the nose joins the forehead. Near the lower end of the support or lift, it is preferably provided with a collar or rib designated 15, which preferably extends completely from side to side of the same, said collar or rib serving the purpose of reinforcing the support or lift, and the additional purpose hereinafter more particularly referred to. The upper or rear side of the collar or rib 15, namely, the side which is nearest to the face when the support or lift 11 is applied onto the nose, is preferably curved or indented, as indicated at 16, so that when the support or lift 11 is applied onto the nose to support spectacles of the type illustrated in Figures 1 to 3 inclusive, the pads 4, 4 will be seated in the indentations 16, 16 and rest directly upon the skirts 12, 12 at the opposite sides of the nose. The thickness of the lift 11 is thus sufficient to elevate the spectacles to bring the reading or close vision areas 6, 6 of the lenses 5, 5, into the desired position for vision at or above the natural eye level, when employing spectacles of the type shown in Figures 1 to 3.

In the case of spectacles having so-called military frames, as illustrated in Figures 4 to 6 inclusive, the bridge 17 which joins the rims 1, 1' of the spectacle frames which contain the lenses 5, 5 having the reading or close vision areas 6, 6, is somewhat lower than the bridge 2 of Figures 1 to 3, said bridge 17 being normally adapted to rest directly upon the wearer's nose in the case of military frames. In such a case, when the temporary lift 11 is employed, the bridge 17 of the military frames will rest upon the upper surface of the collar or rib 15, as more particularly shown in Figures 4 to 6 inclusive. The increased thickness of the lift, as afforded by the collar or rib 15 is sufficient to elevate the military frames and their lenses to such a position as will bring the reading or close vision areas 6, 6 into a position for reading or close vision at or above the natural eye level.

As previously mentioned, the temporary support or lift 11 may be made of transparent plastic material, under which conditions, the lift would assume the color of the skin of the wearer's nose therebeneath, thus making the lift quite inconspicuous. Instead of being transparent, the lift may be made of any suitable opaque material, in which case the material is preferably given a flesh color. Irrespective of the specific nature of the material of which the lift is formed, it is preferably made in a one-piece unitary form and of such size as to be easily and conveniently carried in the pocket or in the wearer's hand bag. It is further capable of being used with practically any style or type of spectacles or glasses, without any modification in the form or design of the lift, and when so used, it gives a fuller and more complete use of the reading or close vision areas of the bifocal lenses, thus obviating the cost and inconvenience of employing an additional or separate pair of spectacles which are particularly designed for vision at higher than normal level.

The thickness of the collar or rib 15 of the lift 11 may be any selected thickness, preferably on the order of 4 mm., more or less, and in order to fit the nose of persons of different age, and to better conform to the ordinary variations in the shape and contour of noses, the lift may be made in various sizes and/or widths. By selecting the widths for three different classes, the average conditions will be taken care of, such classes being identified as follows:

(1) Narrow—18 to 20 mm. across.
(2) Medium—21 to 23 mm. across.
(3) Large—23 to 25 mm. across.

It is to be understood, however, that the foregoing sizes are given solely by way of typical examples and without any intention of specifically limiting the invention thereto.

While the specific details have been herein shown and described, the invention is not confined thereto as changes and alterations may be made without departing from the spirit thereof as defined by the appended claims.

I claim:

1. As a new article of manufacture, a temporary support for bifocal spectacles comprising a self-sustaining arched lift member to be applied onto the bridge of the nose of the wearer at the zone at which the spectacles normally rest on the nose so that the spectacles will rest on the lift member, said lift member being wholly independent of the spectacles but substantially conforming to the transverse shape of the nose and extended over a substantial area lengthwise thereof, and said lift member varying in thickness in at least two zones for selective supporting engagement with spectacles of different types, whereby to elevate the spectacles above the position normally occupied when resting directly on the nose.

2. As a new article of manufacture, a temporary support for bifocal spectacles, comprising a self-sustaining arched lift member to be applied onto the bridge of the nose of the wearer at the zone at which the spectacles normally rest on the nose so that the spectacles will rest on the lift member, said lift member being wholly independent of the spectacles but substantially conforming to the transverse shape of the nose and extended over a substantial area lengthwise thereof, and said lift member being of uniform substantial thickness for a major portion of its length and provided with a thickened portion intermediate its ends for selective supporting engagement with spectacles of different types, whereby to elevate the spectacles above the position normally occupied when resting directly on the nose.

3. As a new article of manufacture, a temporary support for bifocal spectacles, comprising a self-sustaining arched lift member to be applied into the bridge of the nose of the wearer at the zone at which the spectacles normally rest on the nose so that the spectacles will rest on the lift member, said lift member being wholly independent of the spectacles but substantially conforming to the transverse shape of the nose and extended over a substantial area lengthwise thereof, and said lift member being of uniform substantial thickness for a major portion of its length and provided with a thickened rib near the lower end and extending transversely thereof from side to side, for selective supporting engagement with spectacles of different types, whereby to elevate the spectacles above the position normally occupied when resting directly on the nose.

EARL K. SMITH.

REFERENCES CITED

The following references are of record in the file of this patent:

UNITED STATES PATENTS

| Number | Name | Date |
| --- | --- | --- |
| 600,496 | Meyrowitz | Mar. 8, 1898 |
| 1,436,313 | Hafer | Nov. 21, 1922 |
| 1,761,664 | Harris | June 3, 1930 |
| 2,233,689 | Girouard | Mar. 4, 1941 |
| 2,317,873 | Alger | Apr. 27, 1943 |

FOREIGN PATENTS

| Number | Country | Date |
| --- | --- | --- |
| 72,234 | Germany | Dec. 1, 1893 |
| 875,038 | France | June 1, 1942 |